(12) United States Patent
Posti et al.

(10) Patent No.: US 6,701,135 B2
(45) Date of Patent: Mar. 2, 2004

(54) POWER CONTROL IN A MULTI-CARRIER RADIO TRANSMITTER

(75) Inventors: Harri Posti, Oulu (FI); Juha Maatta, Kajaani (FI); Andre Dekker, Oulu (FI)

(73) Assignee: Nokia Corporation, Espoo (FI)

( * ) Notice: Subject to any disclaimer, the term of this patent is extended or adjusted under 35 U.S.C. 154(b) by 601 days.

(21) Appl. No.: 09/749,161

(22) Filed: Dec. 27, 2000

(65) Prior Publication Data

US 2001/0006888 A1 Jul. 5, 2001

Related U.S. Application Data

(63) Continuation-in-part of application No. PCT/EP98/03968, filed on Jun. 29, 1998.

(30) Foreign Application Priority Data

Jun. 29, 1998 (WO) .............................. PCT/EP98/03968

(51) Int. Cl.[7] .......................... H04B 1/02; H04B 1/04; H04Q 11/12
(52) U.S. Cl. ...................... 455/103; 455/69; 455/127.1
(58) Field of Search .................... 455/59, 69, 103–126, 455/127.1, 127.2, 561, 102; 375/205, 260, 200, 345; 370/335, 336, 480; 341/139; 330/254, 278, 129, 130

(56) References Cited

U.S. PATENT DOCUMENTS

| 5,126,688 | A | | 6/1992 | Nakanishi et al. |
| 5,128,629 | A | | 7/1992 | Trinh |
| 5,182,527 | A | | 1/1993 | Nakanishi et al. |
| 5,193,223 | A | | 3/1993 | Walczak et al. |
| 5,293,407 | A | | 3/1994 | Shibata |
| 5,303,268 | A | | 4/1994 | Tsutsumi et al. |
| 5,334,979 | A | | 8/1994 | Hatakeyama |
| 5,337,006 | A | | 8/1994 | Miyazaki |
| 5,530,920 | A | * | 6/1996 | Takeda ........................ 455/102 |
| 5,603,106 | A | | 2/1997 | Toda |
| 6,256,502 | B1 | * | 7/2001 | Santa et al. .................. 455/442 |
| 6,570,929 | B1 | * | 5/2003 | Eriksson ..................... 375/260 |

FOREIGN PATENT DOCUMENTS

| EP | 0 369 135 | | 5/1990 | |
| EP | 0 594 358 | | 4/1994 | |
| EP | 0 735 731 | | 10/1996 | |
| EP | 0743768 A1 | * | 11/1996 | ............. H04J/1/00 |
| EP | 0 825 728 | | 2/1998 | |
| WO | WO 93/02505 | | 2/1993 | |

* cited by examiner

*Primary Examiner*—Lee Nguyen
*Assistant Examiner*—Raymond Persino
(74) *Attorney, Agent, or Firm*—Squire, Sanders & Dempsey L.L.P.

(57) ABSTRACT

A multi-carrier transmitter has combination means for receiving and combining a plurality of carriers including a first modulated carrier for transmission in a first channel and a second modulated carrier for transmission in a second channel, to create a multi-carrier signal. Power control means are arranged to individually vary the power of each of the plurality of carriers before combination.

32 Claims, 9 Drawing Sheets

ANALOGUE SLOW CONTROL ON MULTICARRIER SIGNAL

AVERAGE OVER WHOLE TIME SLOT

AVERAGE OVER TIME SLOT EXCLUDING GUARD PERIODS AND RAMPING TIMES, OVER A SHORTER PERIOD OR PROVIDE PEAK POWER LEVEL

AVERAGE OVER WHOLE TIME SLOT

AVERAGE OVER TIME SLOT EXCLUDING GUARD PERIODS AND RAMPING TIMES, OVER A SHORTER PERIOD OR PROVIDE PEAK POWER LEVEL

AVERAGE OVER WHOLE TIME SLOT

AVERAGE OVER TIME SLOT EXCLUDING GUARD PERIODS AND RAMPING TIMES, OVER A SHORTER PERIOD OR PROVIDE PEAK POWER LEVEL

AVERAGE OVER WHOLE TIME SLOT

AVERAGE OVER TIME SLOT EXCLUDING GUARD PERIODS AND RAMPING TIMES, OVER A SHORTER PERIOD OR PROVIDE PEAK POWER LEVEL

DIGITAL SLOW CONTROL ON INDIVIDUAL CARRIERS

AVERAGE OVER WHOLE TIME SLOT

AVERAGE OVER WHOLE TIME SLOT

AVERAGE OVER TIME SLOT EXCLUDING GUARD PERIODS AND RAMPING TIMES

POWER CONTROL IN A MULTI-CARRIER RADIO TRANSMITTER

This application is a continuation of international application Ser. No. PCT/EP98/03968, filed Jun. 29, 1998.

The present invention relates to a multi-carrier radio transmitter and a method of power control in a multi-carrier radio transmitter. It has particular application to power control in a base station of a cellular radio network.

In a cellular radio network a geographic area is divided into separate cells. Each cell has a base station for communicating with mobile terminals or the like which are within that cell. Each base station has a receiver for receiving signals from the mobile terminals and a transmitter for sending signals to the mobile terminals. The transmitter communicates with the mobile terminals by modulating a carrier wave. In time division multiple access (TDMA) the transmitter transmits a series of TDMA frames where each frame comprises a succession of time slots and each time slots is associated with a separate communication channel. As an example in GSM the number of time slots per frame is eight. A mobile terminal is assigned a particular communication channel and the base station transmits to that mobile terminal in successive frames by sending signal bursts which occupy an assigned time slot.

Each mobile terminal is in a different environment and at a different distance from the base station. The power level of the signal burst from the base station occupying the slots in a TDMA frame may therefore need to be varied from slot to slot (i.e. from mobile terminal to mobile terminal) or from frame to frame (i.e. as the environment of a mobile terminal changes). Each of the signal bursts will be sent with a predetermined transmit power level which will generally differ from slot to slot. In addition, the transmitter is switched off between signal bursts for a predetermined period of time (the guard period) to separate the individual communication channels. Consequently, on the initiation of a burst, transmitted power must be ramped up from a low value to the predetermined transmit level for that communication channel. Furthermore, at the end of the burst the power level must be ramped down from the predetermined transmit level to a low level. According to the GSM standard guard periods have a duration of about 30 μs, time slots are 577 μs, and the time to ramp a signal burst up to its predetermined level or to ramp it down from its predetermined level is approximately 10 μs. The up and down ramping periods are included in the guard period, the remaining portion of the guard period being a constant low power level period.

To increase the number of channels in a cell it is possible to use a number of single carrier narrow band transmitters in a base station where each transmitter is operating with a particular carrier frequency. The allocation of different carrier frequencies to different channels is referred to as frequency division multiple access (FDMA). In each such narrow band, single carrier, transmitter power control is typically achieved by comparing a sample of output power with a reference signal, the output power being adjusted in dependence upon that comparison. U.S. Pat. Nos. 5,334,979, 5,337,006, 5,128,629, 5,603,106, 5,303,268, 5,126,688, 5,182,527 and EP 0369135 describe adjusting output power by varying the single carrier signal at an RF frequency using controllable attenuators or variable gain amplifiers. WO 9302505 and U.S. Pat. No. 5,193,223 perform the adjustment of a single carrier signal at an intermediate frequency. U.S. Pat. No. 5,293,407 describes a digital adjustment of the power level.

A preferred approach for increasing the number of channels in a cell, is to use a multi-carrier broad band transmitter to implement parallel multiple access. FIG. 1 illustrates a transmitter in which first, second and third digital signals 2, 4 and 6 are respectively input to first, second and third modulators 10, 12 and 14 to modulate carriers having frequencies F1, F2 and F3 and produce respective first, second and third digital modulated signals 16, 18 and 20. Each of the first, second and third digital signals 2, 4 and 6 is a stream of data bits be transmitted. Each stream of data bits controls a modulator to produce a digital modulated signal which itself is composed of a stream of digital words.

Each one of the digital modulated signals 16, 18 and 20 is a digital representation of an analogue carrier having respectively frequencies F1, F2 and F3 modulated by respective ones of the first, second and third digital signals 2, 4 and 6. The modulated signals 16, 18 and 20 are input to an adder 22 which combines the signals to create a digital multi-carrier signal 24. The digital multi-carrier signal 24 is input to the first intermediate frequency (IF) block 26, comprising a digital to analogue converter 28, a band pass or low pass filter 30 and an amplifier 32 in series to produce a multi-carrier analogue signal, first IF signal 34. This signal is continuous in time and amplitude in comparison to the digital multi-carrier signal which is discrete in time and amplitude.

This signal is passed to the second IF block 36, comprising a mixer 38, a band pass filter 42 and amplifier 44 in series and a local oscillator 40, to create a second intermediate frequency (IF) signal 45. The second IF signal 45 is supplied to a radio frequency block 46, comprising a mixer 48 and a band pass filter 52 in series and a local oscillator 50. The output of the radio frequency block 46, a radio frequency signal 53, passes in series through a linear power amplifier and a band pass filter 56 to produce a power amplified radio frequency signal 57 which is then transmitted by an antenna 58. As an example, the radio frequency signal has a carrier with a frequency range of 925–960 MHz. The multiple signals are combined in digital format, before conversion to analogue. In a TDMA system the slots and frames of the different carriers are synchronised.

The multi-carrier transmitter therefore operates in parallel and does not have separate transmitter components for each carrier wave, which allows wide band multi-carrier transceivers to be of reduced cost and size.

It is an aim of embodiments the present invention to provide power control in a multi-carrier radio transmitter.

According to one aspect of the present invention there is provided A multi-carrier radio transmitter comprising combination means for receiving and combining a plurality of carriers including a first modulated carrier for transmission in a first channel and a second modulated carrier for transmission in a second channel, to create a multi-carrier signal; and open loop power control means arranged to individually vary the power of each of the plurality of carriers before said combination and closed loop power control means arranged to vary the output power of the transmitter, the closed loop power control means being configured to operate on the multi-carrier signal after the combination means.

According to another aspect of the present invention there is provided a method of power compensation in a multi-carrier radio transmitter, wherein a plurality of carriers are combined to create a multi-carrier signal, said plurality of carriers including a first modulated carrier for transmission in a first channel and a second modulated carrier for transmission in a second channel, the method comprising the steps of:

(a) determining the transmit power level required in each carrier;
(b) varying the power level of each carrier to the determined levels using open loop power control;
(c) combining the carriers to form the multi-carrier signal; and
(d) compensating for changes in the power level of said multi-carrier signal using closed loop power control, by:
   detecting said multi-carrier signal; and
   adjusting the power of said multi-carrier signal in dependence upon said detection.

Preferably in both aspects, the open loop power control is configured to effect relatively fast power variations and the closed loop power control is configured to effect relatively slow power variations.

Power control is particularly important in a cellular network when TDMA is being implemented. The size of the cell is determined by the maximum transmitted power of the base station within that cell. It is therefore necessary to limit the maximum transmitter power for all transmitters in a cell to control the overlap of neighbouring cells and interference resulting therefrom. This type of power control will henceforth be referred to as static power control. Static power level may be changed in connection with network replanning. Power control is also needed in TDMA to control the ramping of a burst signal at the beginning and end of a transmission burst. This is called power ramping. In addition, the attenuation in a communication channel between a base station and a mobile terminal may change significantly in short periods of time, for example, as a mobile terminal moves behind an obstruction. It is therefore important that in each communication channel, defined by a carrier frequency and a time slot, the power level at which the base station transmits to a mobile terminal can be altered for each time slot. This type of power control will henceforth be referred to as dynamic power control. Dynamic power control does not affect the output power during a burst but between successive bursts. The difference between bursts may be as much as 30 dB. Dynamic power control and power ramming together constitute what will in the following discussion be called fast power control. Finally, due to variations in temperature and ageing the output power of a transmitter can vary over time, and this variation should be compensated, which is henceforth referred to as slow power control. The responsivity required for slow power control is mainly dictated by the effect of temperature variations in the power amplifier. This may require compensation every few seconds or minutes.

Embodiments of the present invention preferably have separate fast and slow power control. The fast control is preferably done in an open loop by digital multiplication of individual modulated carriers with digital control signals. The digital control signal for each carrier may control fast variations in the transmission signal. In a TDMA system, the digital control signal may be different for each carrier and for each time slot in each frame. Static power control may be facilitated by confining the dynamic power control to the limits of the assigned static power control level or in other ways. Slow power control is done in a closed loop and includes measuring the multi-carrier signal.

According to a first embodiment of the present invention the controller preferably produces a reference signal and a power coupler in said power control loop, coupled to said analogue multi-carrier signal to produce a detected signal. The variable amplification means may be responsive to variations in the detected signal with respect to the reference signal to vary the amplification of said analogue multi-carrier signal. The variable amplification means may include a comparator, connected to a variable attenuator or amplifier in the path of the multi-carrier signal.

According to further embodiments of the present invention the power control loop preferably comprises the controller and an analogue to digital conversion means, wherein said power coupler is coupled to said analogue multi-carrier signal to produce an analogue detected signal which is converted to a digital detected signal by said analogue to digital conversion means and provided to said controller, said controller controlling the compensation of said analogue multi-carrier signal in dependence thereon.

The power control loop may effect power compensation of the analogue multi-carrier signal responsive to the combined variations of all the carriers in said analogue multi-carrier signal. In this instance, the power compensation of said analogue multi-carrier signal may be effected by varying the modulated carriers before combination to create a multi-carrier digital signal, or by varying the multi-carrier digital signal after its creation.

Alternatively, the power control loop may effect the power compensation of the analogue multi-carrier signal by compensating each of said carriers before combination responsive to the individual variations of the carriers in said analogue multi-carrier signal.

The power control means may comprise an open loop for effecting fast power variations and a closed loop for effecting slow power variations. The power control means may receive said plurality of input control signals and produce in response to each of said plurality of input control signals a power control signal for individually varying the power of each of the plurality of carriers before said combination to create said multi-carrier signal. The combination means may be a digital combination means which receives and combines digital signals to create a digital multi-carrier signal. Preferably the modulation of said first and second carriers is controlled by first and second digital signals. Preferably, each of said power control signals is a digital signal.

A plurality of second combination means may be provided, each being arranged to combine one of said modulated carriers with one of the power control signals. Digital to analogue conversion means may be arranged to convert the multi-carrier signal to an analogue signal for transmission. Each of said plurality of input control signals may be associated with a channel and its variation may be indicative of the variation of power attenuation in said channel. The power control means may be operable responsive to said input control signals to compensate for power attenuation in each channel. The power control means may further comprise a closed power control loop having detection means for detecting said multi-carrier signal to be transmitted and means responsive to the detecting means for altering the power of said multi-carrier signal responsive to said detected multi-carrier signal. Preferably, said closed power control loop compensates for slow variations or drifts in the power of said multi-carrier signal.

The detection means may detect the average power or the amplitude of the multi-carrier signal to be transmitted. The detection means may comprise a diode detector. The closed power control loop may effect power compensation of the multi-carrier signal responsive to the combined variations of all the carriers in said multi-carrier signal. The power control means may produce a reference signal, which may be analogue, and the detecting means in said closed power control loop may couple to said multi-carrier signal to produce a detected signal, said power control means being responsive to variations in the detected signal with respect to the reference signal to alter the power of said multi-carrier signal. The reference signal may be controlled by said input control signals.

The closed power control loop may comprise a comparator connected to control a variable amplifier in the path of said multi-carrier signal, said comparator receiving said detected signal and said reference signal as inputs. The closed power control loop may comprise a controller wherein said detection means couples to said multi-carrier signal to produce a detected signal which is provided to said controller which controls the altering of the power of said multi-carrier signal. The detected signal may be analogue-to-digital converted. The closed power control loop may comprise amplification means in the path of said multi-carrier signal, wherein said controller provides a compensation signal to the amplification means to compensate said multi-carrier signal. The compensation signal may be responsive to said input control signals.

The closed power control loop may comprise scaling means for amplifying said analogue multi-carrier signal and a second digital to analogue conversion means, wherein the power control loop of said control means provides a compensation signal to said scaling means via said second digital to analogue conversion means to compensate said analogue multi-carrier signal. The scaling means may be digital. The compensation signal may be provided to control the digital to analogue conversion means arranged to produce said analogue multi-carrier signal. The compensation signal may be provided to control an amplifier in the path of said analogue multi-carrier signal. The amplifier may amplify the analogue multi-carrier signal after conversion to an intermediate frequency or the variable amplifier may amplify the analogue multi-carrier signal at a radio frequency.

The power control loop may be arranged to individually compensate said plurality of carriers before their combination to create said multi-carrier signal. The control means may be arranged to individually compensate said power control signals. The controller may effect power compensation of the multi-carrier signal by compensating each of said carriers before combination responsive to the individual variations of the carriers in said multi-carrier signal. The power control means may comprise a channeliser for providing a digital detected signal in respect of each channel to said controller.

Preferably, each of said plurality of carriers has a different frequency, and, in successive predetermined periods of time, the carrier is transmitted to different receivers. The control means may vary the power of each of the plurality of carriers before combination by ramping each modulated carrier to an individually predetermined amplitude at the start of each successive predetermined period and ramps each modulated carrier downward at the end of each predetermined period. The power control means may reflect individual variation of the power of each of the carriers in dependence on the frequency of the carrier. Static power may be controlled by said closed power control loop. Static power may be controlled by said power control signals.

Embodiments of the invention are applicable to a transceiver comprising a multi-carrier radio transmitter as described hereinbefore and a receiver, wherein said input control signals are responsive to the signals received at said receiver.

The method embodying the present invention, preferably further comprises the step of: d) compensating for changes in the power level of said multi-carrier signal using a closed power control loop by: detecting said multi-carrier signal; and adjusting the power of said multi-carrier signal in dependence on said detection. In step d) the process of detecting the multi-carrier signal may comprise detecting the combined power level of the carriers in said multi-carrier signal. In step d) the process of detecting the multi-carrier signal may comprise separately detecting the power levels of each of the carriers in the multi-carrier signal.

In step d) the process of adjusting the multi-carrier signal may be effected after the combination of the plurality of carriers. In step d) the process of adjusting the multi-carrier signal may be effected by individually varying the power level of each of said plurality of carriers before their combination. The method may further comprise the step of converting the multi-carrier signal from a digital signal to an analogue signal, said adjusting of the multi-carrier being effected before said conversion step. The method may further comprise the step of converting the multi-carrier signal from a digital signal to an analogue signal, said adjusting of the multi-carrier signal being effected during or after said conversion step.

The step of detecting the power level of said multi-carrier signal may comprise coupling to the multi-carrier signal after its conversion from digital to analogue. The method may further comprise the step of upconverting said analogue multi-carrier signal to an intermediate frequency, said adjusting of the multi-carrier signal being effected after said upconversion step. The method may further comprise the step of upconverting said analogue multi-carrier signal to a radio frequency, said adjusting of the multi-carrier signal being effected after said upconversion step.

Step b) may comprise combining each one of a plurality of power control signals produced in step a) with a respective one of said plurality of modulated carrier signals. The process of adjusting the multi-carrier signal may be effected by varying each of said plurality of said power control signals. In step b) the varying of the power level of each carrier may be dependent upon the frequency of the carrier. In step c) the combining of the carriers may occur when they are digital signals.

Embodiments of the present invention find particular application in cellular radio communications networks which operate in accordance with the GSM standard.

For a better understanding of the present invention and to understand how the same may be put into effect, reference will now be made by way of example only to the enclosed drawings in which:

FIGS. 2b, 2c, 2d and 2e are schematic representations of alternative microprocessors suitable for use in the circuitry of FIG. 2a;

FIGS. 4b and 4c are schematic representations of alternative microprocessors suitable for use in the circuitry of FIG. 4a;

FIGS. 5b and 5c are schematic representations of alternative microprocessors suitable for use in the circuitry of FIG. 5a.

Figure 1:
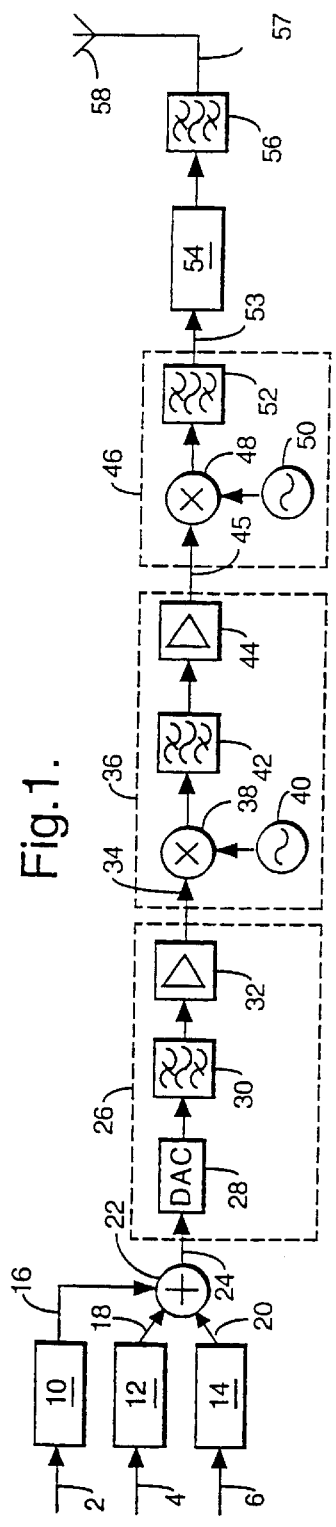
FIG. 1 illustrates a multi-carrier wide band transmitter without power control.

In the following, six separate embodiments of the present invention will be described. To make these descriptions concrete, the embodiments will be described in the context of a transmitter operating in accordance with the GSM standard and hence using TDMA. It should however be understood that the present invention has application outside the particular context in which the embodiments are described, and may in particular find application wherever two carrier frequencies are used for transmission in parallel such as in frequency division multiple access or some implementations of code division multiple access (CDMA).

Throughout the description like reference numerals refer to like things.

In the following described embodiment the fast power control is achieved using an open loop, slow power control is achieved using a closed loop and static power control is effected by containing the dynamic power control to particularly limits or separately. In this context fast power control relates to variations in power of the transmitted signal which occur over a time scale of seconds or less, and includes the power ramping and dynamic power control. In FIGS. 2a, 3a, 3b, 3c, 4a and 5a the open power control loop comprises a controller 110, which is typically an ASIC and a digital combiner 100 having first, second and third multipliers 102, 104 and 106. Each multiplier scales one of the digital modulated carrier signals 16, 18 and 20. The control signals 112, 114 and 116 are digital words which affect the magnitude of the streams of digital words making up the digital modulated signals 16, 18 and 20. A digital word of the first modulated signal 16 is multiplied with a digital word of the first power control signal 112 in the first multiplier 102 and the digital word output from the multiplier is provided to the adder 22. The second modulated signal 18 is likewise multiplied with the second power control signal 114 in the second multiplier 104, and the output of the second multiplier is provided to the adder 22. The third modulated signal 20 is likewise multiplied with the third power control signal 116 by the third adder 106, and the output of the multiplier is applied to the adder 22. Adder 22 combines its inputs to produce the digital multi-carrier signal 24.

The first, second and third input control signals 113, 115 and 117 respectively vary the power of the carrier associated with the first, second and third digital signals 2, 4 and 6. Known fluctuations in the frequency response of the transmitter can be taken into account in the power control signals 112, 114 and 116 by adding a frequency dependent correction parameter to them via input control signals 113, 115 and 117. Each of the first, second and third input control signals 113, 115 and 117 may vary from time slot to time slot within a TDMA frame. Consequently in described embodiments, dynamic power control including ramping are effected in the digital domain in respect of each carrier before the carriers are combined to produce the digital multi-carrier signal 24.

The input control signals 113, 115 and 117 are produced in response to instructions from a cellular switch, base station controller or similar entity by the receiver. Each input control signal is indicative of the attenuation occurring in the transmission channel which is controlled by that control signal. The control signal may for instance be derived by comparing the power of a signal received from a mobile terminal at a receiver with the expected power level. As the attenuation in a communication channel varies so does the input control signal associated with that channel.

Static power control is effected by confining the dynamic power control to particular limits, or separately.

Slow power control is achieved by using a feed-back loop 130. The slow power control loop compensates for drifts or slow variations in the power level of the output signal of the transmitter. In this context slow variations typically occur over a period of minutes or more. Slow power control is implemented in different ways in each of the embodiments described below. The slow power control compensates for variations, for example due to temperature or ageing, in the components of the transmitter's output path, for example first IF block 26, second IF block 36 and radio frequency block 46. This process involves detection of the power of the multi-carrier signal. Such detection preferably but not necessarily occurs as late as possible in the transmission path, i.e. at the RF frequency.

First Embodiment

Figure 2A:
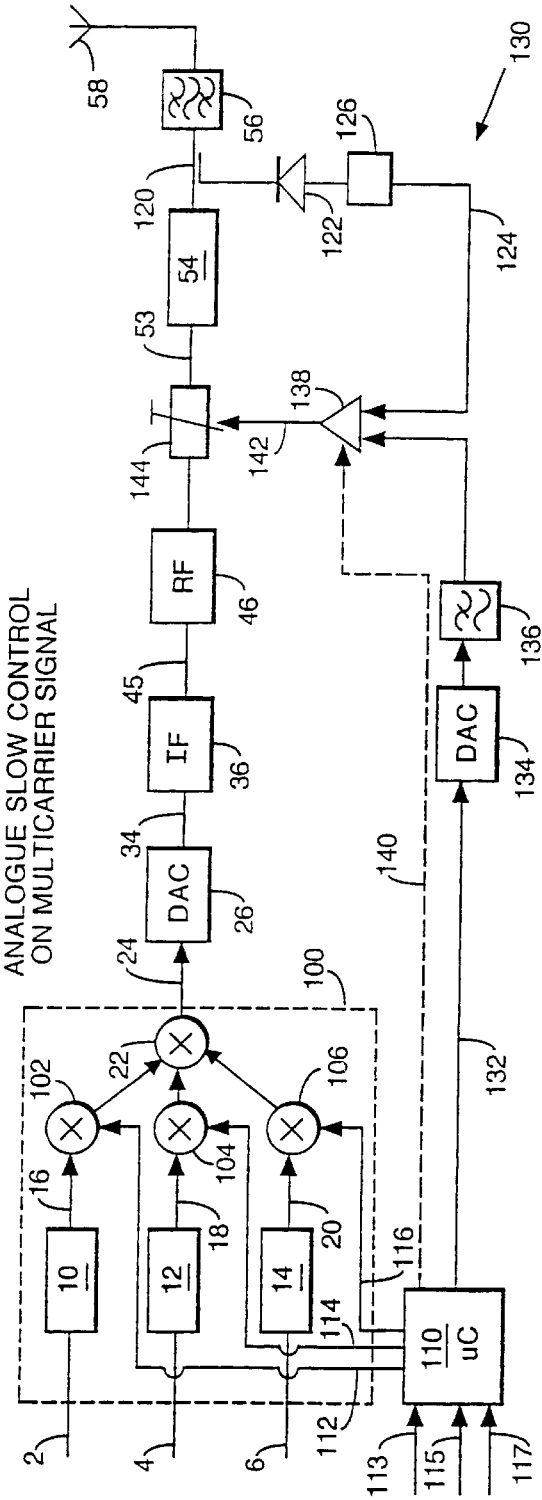
FIG. 2a illustrates a multi-carrier wide band transmitter according to a first embodiment of the present invention.

FIG. 2a illustrates a first embodiment. Slow power control is achieved using the closed power control loop 130. The microprocessor 110 produces a digital reference signal 132 which is passed through a digital to analogue converter 134 and low pass filter 136 to be supplied as a first input to a comparator 138. A power coupler 120 samples the radio frequency multi-carrier signal 53 and provides a sampled signal via a power detector 122 and then to an averager 126 which produces the detected power signal 124. The averager 126 smooths out fluctuations in the multicarrier signals caused by vector summing of the phase modulated carriers at different frequencies. A suitable averaging period in GSM may be 50 $\mu$s. The detected power signal 124 scales with the transmit power of the multi-carrier signal 53 and is supplied as a second input to the comparator 138. The comparator 138 supplies a control signal 142 to a variable attenuator 144 in the path of the radio frequency signal 53 but upstream of the power coupler 120. The variable attenuator 144 is controlled by the comparator 138 to maintain the detected power signal 124 substantially equal to the analogue reference signal derived from the digital reference signal 132.

Although a variable attenuator 144 is illustrated, it could be replaced by a variable gain amplifier. The position of the variable attenuator or variable gain amplifier may also be adjusted. It should be upstream of the diode detector 120 but it may be placed in the path of the first IF multi-carrier signal 34 or alternatively in the path of the second IF multi-carrier signal 45.

The microprocessor 110 may also produce a timing control signal 140 which is illustrated as a dashed line in FIG. 2a. When activated, this timing control signal 140, disables the comparator 138.

According to a first implementation the timing control signal 140 is not used and the slow control loop is continually active. The digital reference signal 132 must therefore take into account the time variance of the output power of the multi-carrier signal. In particular, during the guard periods of the carriers the output power of the contribution that a carrier makes to the multi-carrier signal should be approximately zero, it should then ramp upwards at the beginning of a time slot, be maintained over the duration of the time slot and then be ramped downwards at the end of the time slot. The digital reference signal 132 varies with time to take into account this time variance of the carrier components of the multi-carrier signal.

According to a second implementation, the closed control loop is only operational when each of the carriers which are combined to form the multi-carrier signal have been ramped up to their predetermined transmit levels during a time slot. The signal 140 gates the comparator 138 during the guard periods thereby disabling it. In this instance, the digital reference signal will have a fixed value for each time slot. The timing control signal 140 will disable the comparator 138 during guard periods and while the multi-carrier signal 24 is being ramped upwards and downwards. It is also advantageous to zero the averagers during the guard period in order to remove the energy from the previous slot.

According to a third implementation, the closed control loop is only operational at the end of a time slot. In this instance the digital reference signal 132 will be set to a fixed value in the middle of the guard period. In this implementation it is possible to use a step attenuator instead of a continuously variable one.

According to a fourth implementation the averager 126 is replaced by a peak hold circuit which is reset during the guard period. The reference signal 132 represents the desirable peak power value. The comparison of the actual peak power value and the reference peak power value is carried out at the end of the time slot and the output power for the next time slot is set by the comparator in the middle of the guard period.

Figure 2B:
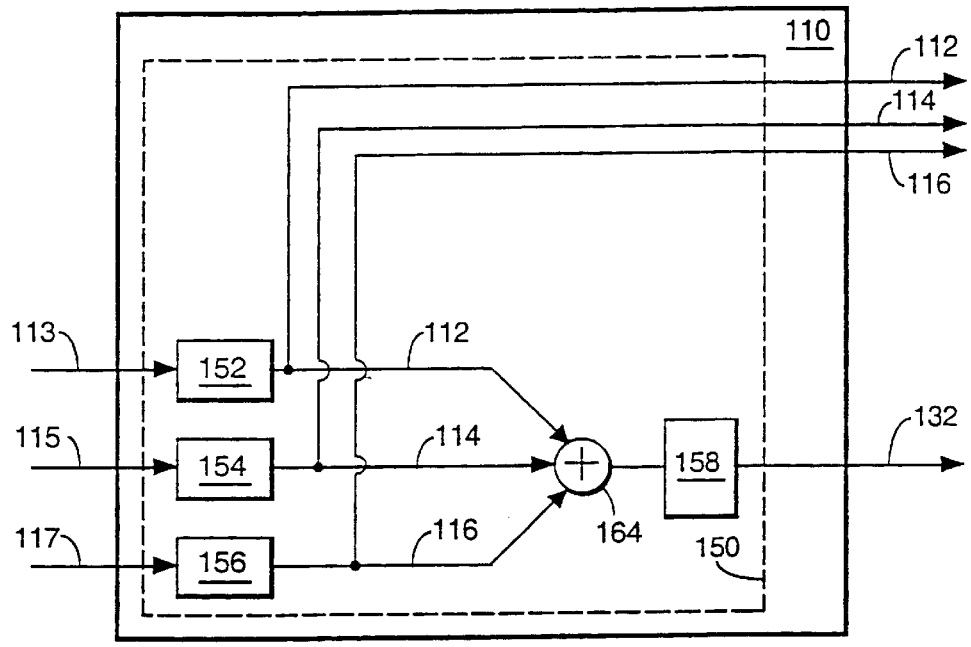

FIG. 2b schematically illustrates a microprocessor 110 suitable for use in the first implementation. The microprocessor 110 has control circuitry 150, which comprises first, second and third ramp generators 152, 154 and 156, an averager 158 and an adder 164. The first, second and third input control signals 113, 115 and 117 are respectively supplied to the first, second and third ramp generators 152, 154 and 156 which in response thereto produces first, second and third power control signals 112, 114 and 116 which are simultaneously output from the microprocessor 110 and supplied to the adder 164. The power control signals 112, 114 and 116 are combined by the adder 164 and output to the averager 158 which averages the output of the adder 164 to create the digital reference signal 132. In this implementation power averaging is done over a part or the whole time slot and the digital reference signal 132 takes into account the ramping component within the first, second and third power control signals 112, 114 and 116.

The averaging performed by the averager 158 can be alternatively provided by three averagers. One averager is connected to the output of each ramp generator so that the output of each ramp generator 158, 160 and 162 is averaged before being added together by the adder 164. The averaging function may also be incorporated within the comparator 138. In a GSM system the averaging may typically occur over a period of 50 μs. The averaging times and delays in the inputs to the comparator 138 should be made equal.

Figure 2C:
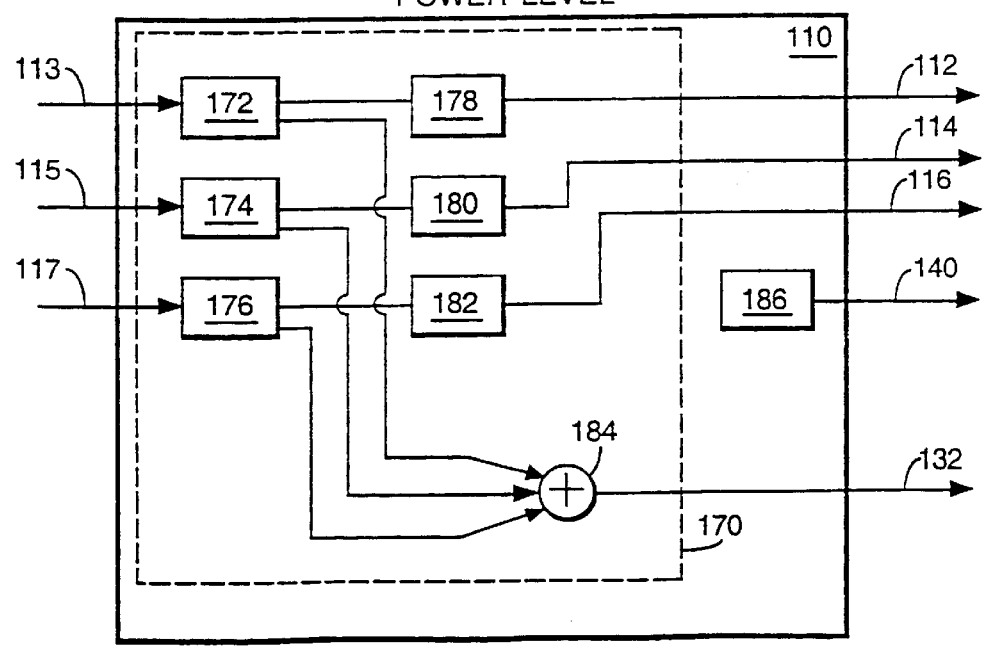

FIG. 2c schematically illustrates the microprocessor 110 suitable for carrying out the second, third and fourth implementations in which the digital reference signal 132 does not take into account the ramping of the carrier signals but only the predetermined power level at which the carrier signals will be transmitted. The microprocessor 110 has control circuitry 170 which comprises first, second and third registers 172, 174 and 176, first, second and third ramp controllers 178, 180 and 182, an adder 184 and a timer controller 186. The first, second and third registers receive respectively the first, second and third input control signals. In the fourth implementation, the adder 184 is adapted to output the peak power value.

The first, second and third ramp controllers 178, 180 and 182 respectively control the ramping up and ramping down of the first, second and third digital modulated signals 16, 18 and 20 to and from their predetermined power levels. The first input control signal 113 is passed sequentially through the first register 172 and first ramp controller 178 to produce the first power control signal 112. Likewise, the second and third input control signals 115 and 117 are passed through their respective second and third registers 174, 176 and ramp controllers 180, 182 to produce second and third power control signals 114 and 116. The outputs from the first, second and third registers are combined in the adder 184 to produce digital reference signal 132. The adder 184 is adapted to introduce a predetermined delay so that the detected signal and the reference signal of the closed loop 130 are synchronised. The digital reference signal 132 may be delayed if necessary to take into account delays in the loop 130.

The timing controller 186 produces timing control signal 140. This signal disables the comparator 138 during guard periods including the periods of ramping up and ramping down.

The digital processing requirements for microprocessor 110 are low.

Figure 2D:
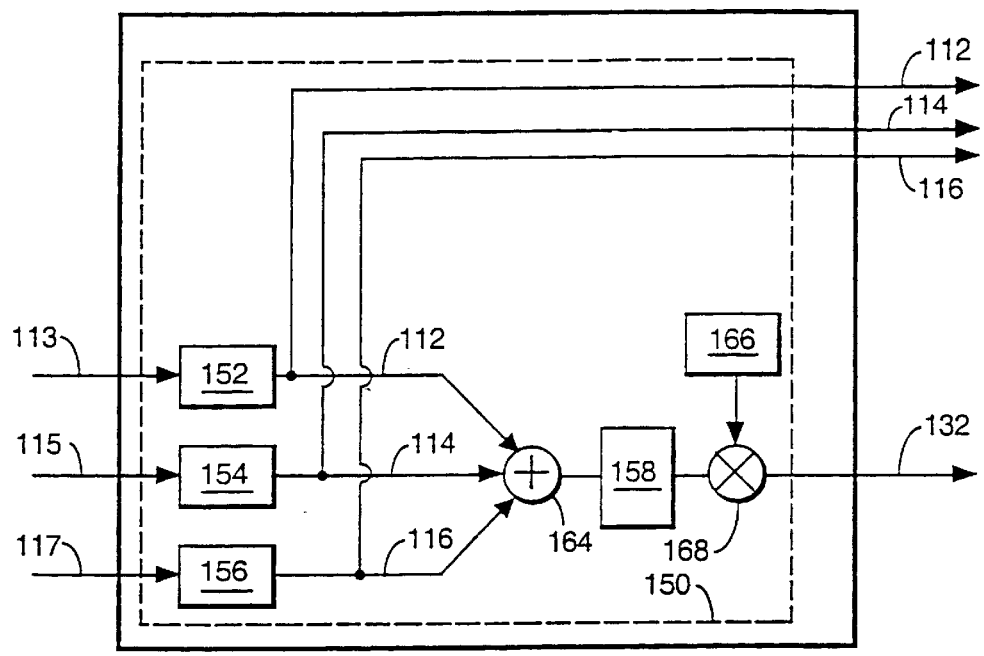

With reference to FIG. 2d according to a variation on the first implementation previously described, static power control is not achieved by maintaining dynamic power control between fixed limits. Referring to FIG. 2d, a static power controller 166 provides a digital signal to multiplier 168 which receives the output from adder 164 and produces the digital reference signal 132. The static power controller 166 thereby controls the static power via the digital reference signal 132.

Figure 2E:
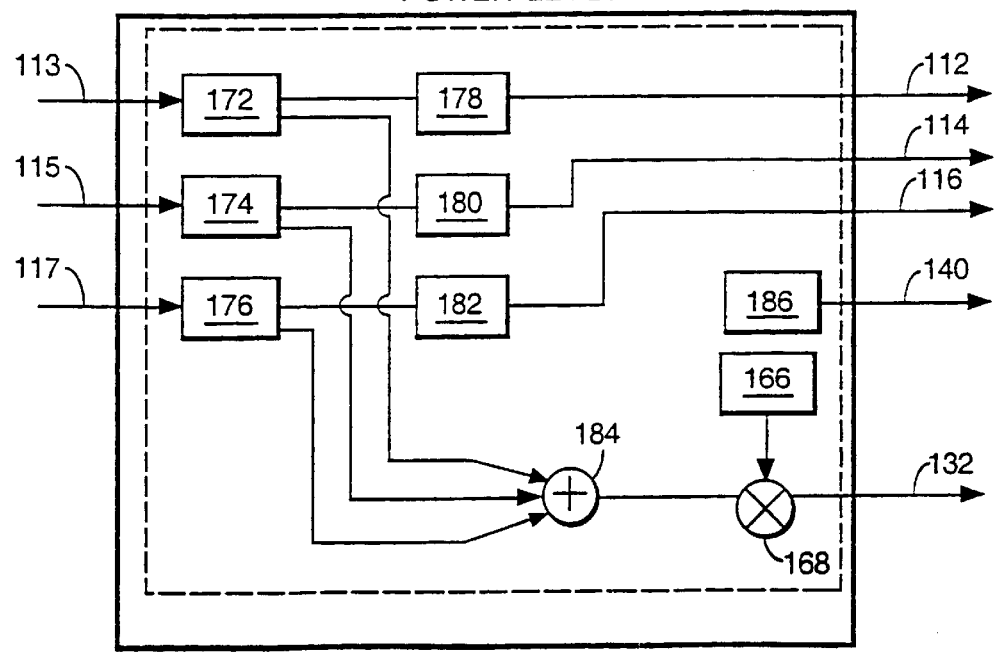

According to a variation of the second, third and fourth implementation, static power control is not achieved by limiting dynamic power control between certain limits but is implemented separately. Referring to FIG. 2e, a static power controller 166 provides a signal to a multiplier 168. The multiplier 168 also receives the output from the adder 184 to produce the digital reference signal 132. The static controller 166 therefore controls the static power of the transmitter via the digital reference signal 132. In the fourth implementation, the adder 184 is adapted to output the peak power value.

Second, Third and Fourth Embodiments

Figure 3A:
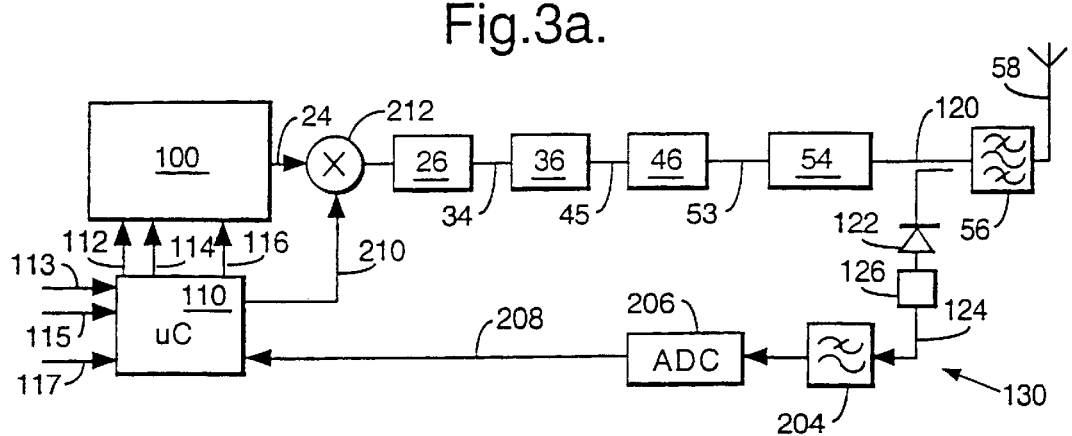
FIG. 3a illustrates a wide band multi-carrier transmitter in accordance with a second embodiment of the present invention.

FIG. 3a illustrates a second embodiment. In this embodiment the slow control loop includes the microprocessor 110 which effects a compensation of the digital multi-carrier signal. The detected power signal 124 produced by the power coupler 120 power detector 122 and averager 126 is passed through a low pass filter 204 and analogue to digital converter 206 to produce a digital detected signal 208 which is input to the microprocessor 110. The power control loop is completed by the microprocessor 110 providing a digital compensation signal 210 to a multiplier 212 in the path of the digital multi-carrier signal 24. The multiplier 212 scales the digital multi-carrier signal 24 using the digital compensation signal 210 to produce a compensated digital multi-carrier signal which is supplied to the first IF block 26 and then processed as before. The need for a variable radio frequency or intermediate frequency attenuator or amplifier is avoided.

Figure 3B:
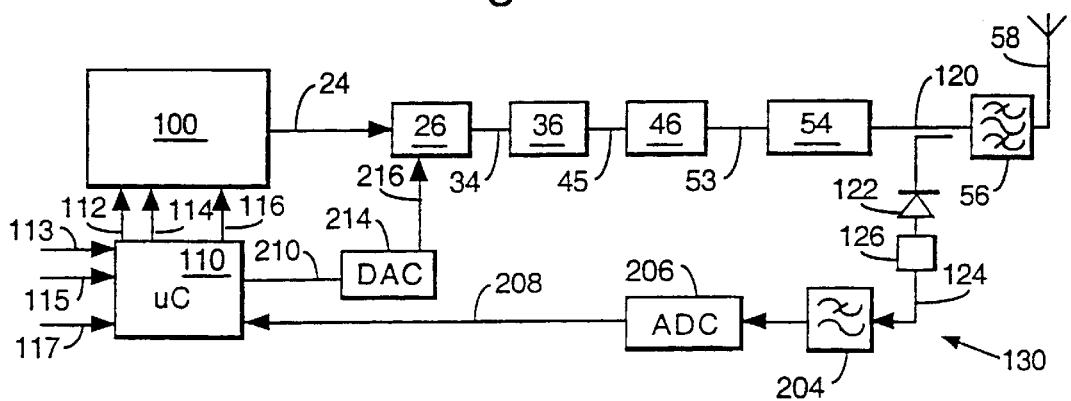
FIG. 3b illustrates a wide band multi-carrier transmitter in accordance with a third embodiment of the present invention.

FIG. 3b illustrates a third embodiment which differs from the second embodiment in that the multiplier 212 is absent and the digital compensation signal 210 produced by the microprocessor 110 is converted by a digital to analogue converter 214 into an analogue compensation signal 216 which is in turn supplied to the first IF block 26. The analogue compensation signal 216 controls the reference voltage of the digital to analogue converter 28 within the first IF block 26. In this embodiment the microprocessor 110 effects slow power control by varying the multi-carrier signal on its conversion from digital to analogue.

Figure 3C:
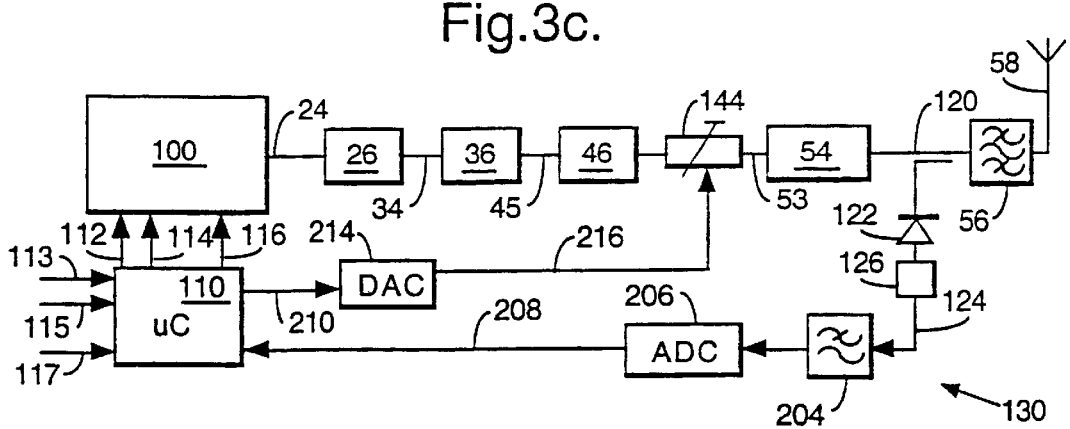
FIG. 3c illustrates a wide band multi-carrier transmitter in accordance with a fourth embodiment of the present invention.

FIG. 3c illustrates a fourth embodiment which differs from the third embodiment in that the analogue compensation signal 216 is provided to a variable attenuator 144 in the path of the radio frequency multi-carrier signal 53. The variable attenuator 144 may be replaced by a variable amplifier. The variable attenuator or variable amplifier may be placed in the path of the analogue multi-carrier signal 34 on the first or second intermediate frequency or the radio frequency.

Figure 3D:
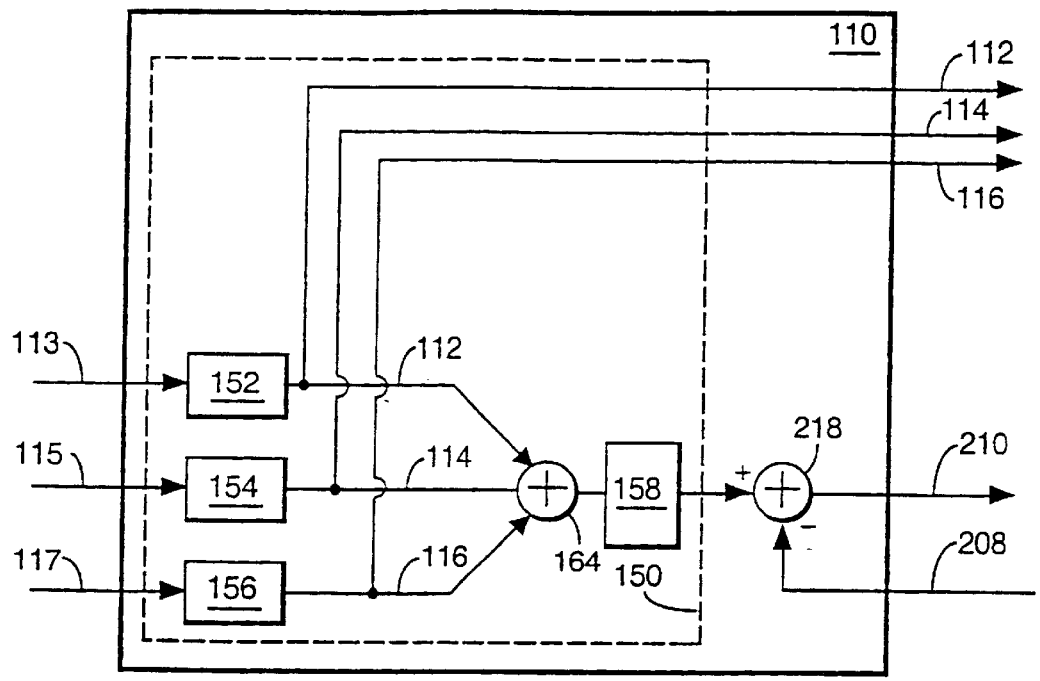
FIGS. 3d, 3e, 3f and 3g are schematic representations of alternative microprocessors suitable for use in the circuitries illustrates in FIGS. 3a, 3b and 3c.

FIG. 3d schematically illustrates a microprocessor 110 suitable for use in the circuitry of FIG. 3a, 3b or 3c according to a first implementation. A separate digital compensation signal 210 is produced for each time slot and for the whole duration of each time slot. The digital compensation signal 210 takes into account the ramping up and ramping down of the carriers which are combined to form the multi-carrier signal 24. The microprocessor 110 has circuitry 150 as described in relation to FIG. 2b and a subtracter 218. The control circuitry 150 produces first, second and third power control signals 112, 114 and 116. The output of the averager 158 within the control circuitry 150 is supplied to the subtracter 218 which subtracts the digital detected signal 208 from the output of the averager 158 to produce the digital compensation signal 210.

Figure 3E:
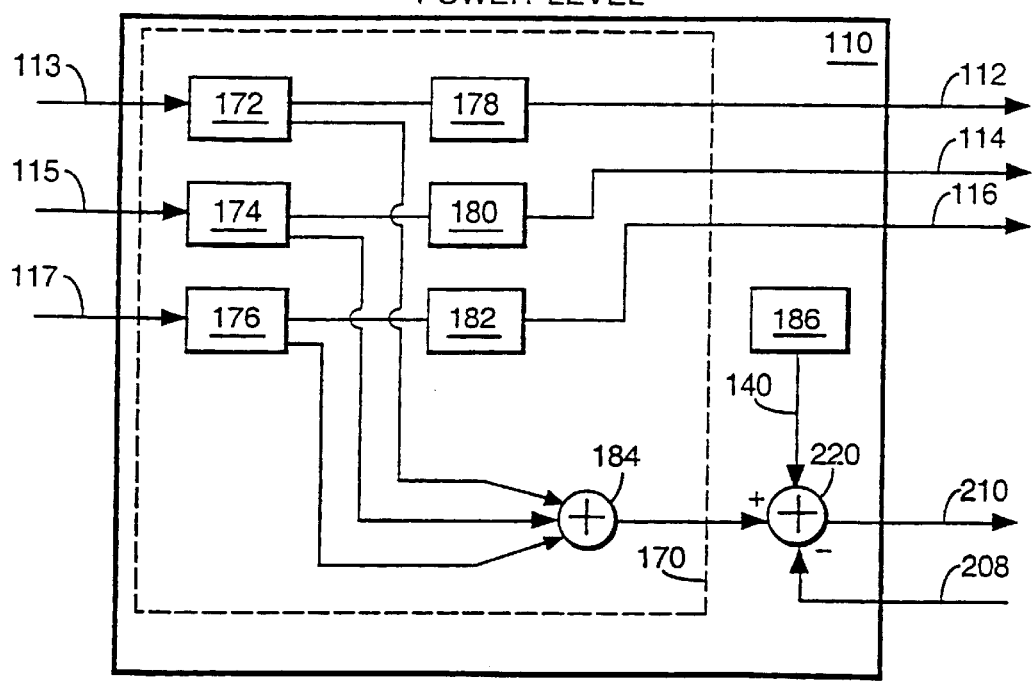

FIG. 3e schematically illustrates a microprocessor 110 suitable for use in the circuitries of FIGS. 3a, 3b and 3c according to a second implementation. The digital compensation signal 210 does not take into account the ramping up and ramping down of the carriers which are combined to form the multi-carrier signal 24. The microprocessor 110 has control circuitry 170 as illustrated in FIG. 2c and an adder 184. The control circuitry 170 produces first, second and third power control signals 112, 114 and 116. The output of the adder 184 within the control circuitry 170 is supplied to the subtracter 220 which also receives the digital detected signal 208. The subtracter 220 subtracts the digital detected signal 208 from the output of the adder 184 to produce the digital compensation signal 210. The power loop 130 is disabled during the guard periods by timing controller 186 disabling subtractor 220 using signal 140 thereby preventing power control during the guard periods.

Third and fourth implementations, similar to those described in relation to the first embodiment can be achieved with the arrangement shown in FIG. 3e. It should be appreciated that the adder 184 of the second embodiment is similar to that described in relation to the first embodiment.

Figure 3F:
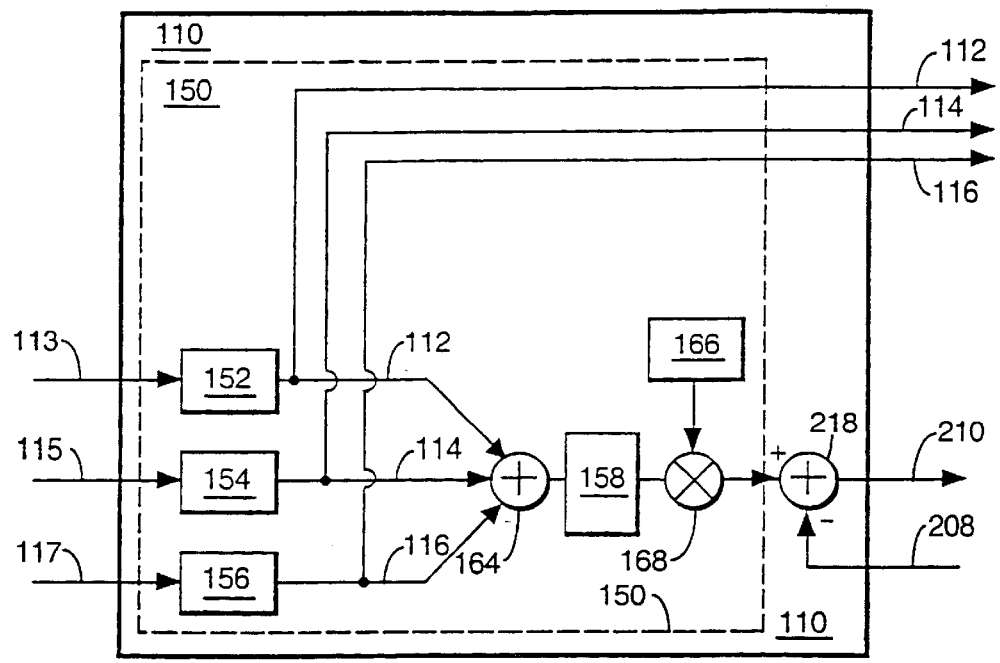

According to a variation on the first implementation previously described with reference to FIG. 3d, static power control is not achieved by maintaining dynamic power control between fixed limits. Referring to FIG. 3f, in the variation, a static power controller 166 provides a digital signal to multiplier 168 which receives as its input the output from adder 164 and supplies its output to subtractor 218. The static power controller 166 thereby controls the static power via the digital compensation signal 210.

Figure 3G:
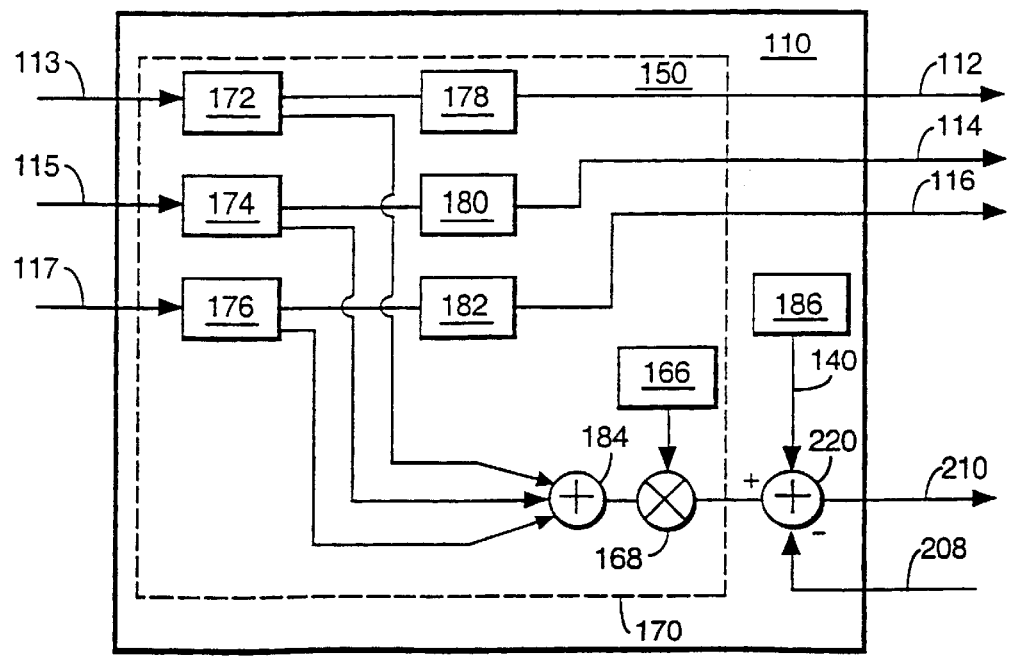

According to a variation of the second, third or fourth implementation, previously described with reference to FIG. 3e, static power control is not achieved by limiting dynamic power control between fixed limits. Referring to FIG. 3g, in the variation, a static power controller 166 provides a digital signal to multiplier 168 which receives as its input the output from adder 184 and supplies its output to subtractor 220. The static power controller 166 thereby controls the static power via the digital compensation signal 210.

Fifth Embodiment

Figure 4A:
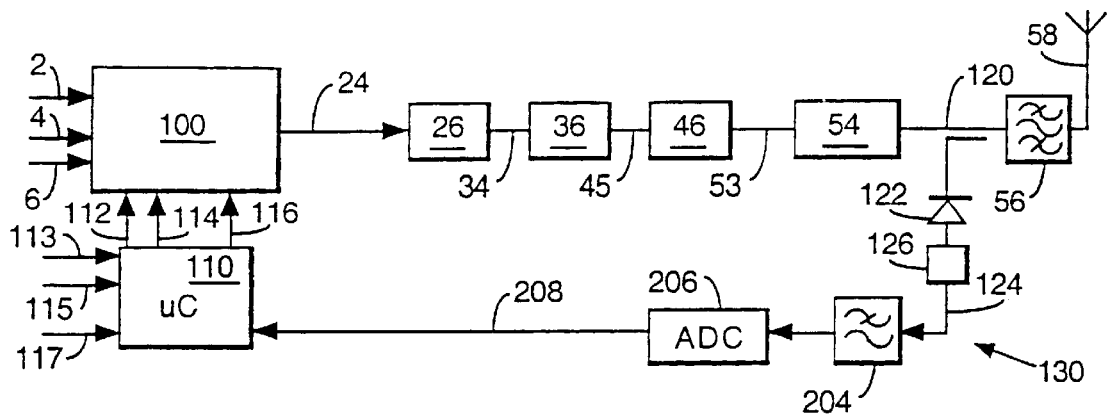
FIG. 4a illustrates a wide band multi-carrier transceiver in accordance with a fifth embodiment of the present invention.

FIG. 4a illustrates a fifth embodiment in which the slow control loop includes the microprocessor 110 which effects compensation of the multi-carrier signal 53 by individually controlling power levels of the carriers before they are combined to produce digital multi-carrier signal 24. The digital detected signal 208 is produced and input to the microprocessor 110 as previously described in relation to FIGS. 3a, 3b and 3c. The power control loop is completed through the first, second and third power control signals 112, 114 and 116 which are supplied to the digital combiner 100 by the microprocessor 110.

Figure 4B:
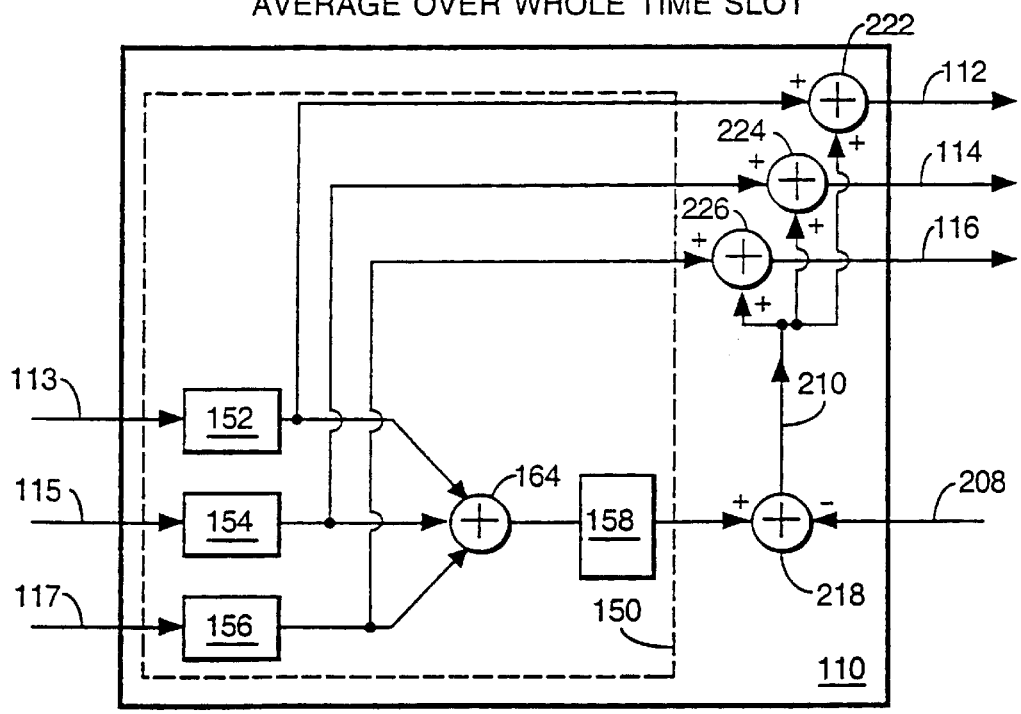

FIG. 4b schematically illustrates the microprocessor 110 suitable for use in the circuitry of FIG. 4a. The microprocessor 110 has control circuitry 150 and a subtracter 218 which are connected as described in relation to FIG. 3d. It additionally comprises first, second and third adders 220, 224 and 226 which combine the outputs of the first, second and third ramp generators 152, 154 and 156 within the control circuitry 150 with the digital compensation signal 210 produced by the adder 218, to produce respectively the first, second and third power control signals 112, 114 and 116. This microprocessor 110 is suitable for use where the digital compensation signal 210 is produced for a part or the whole duration of each time slot and takes into account the ramping up and ramping down of the carriers which combine to form the multi-carrier signal 24.

Figure 4C:
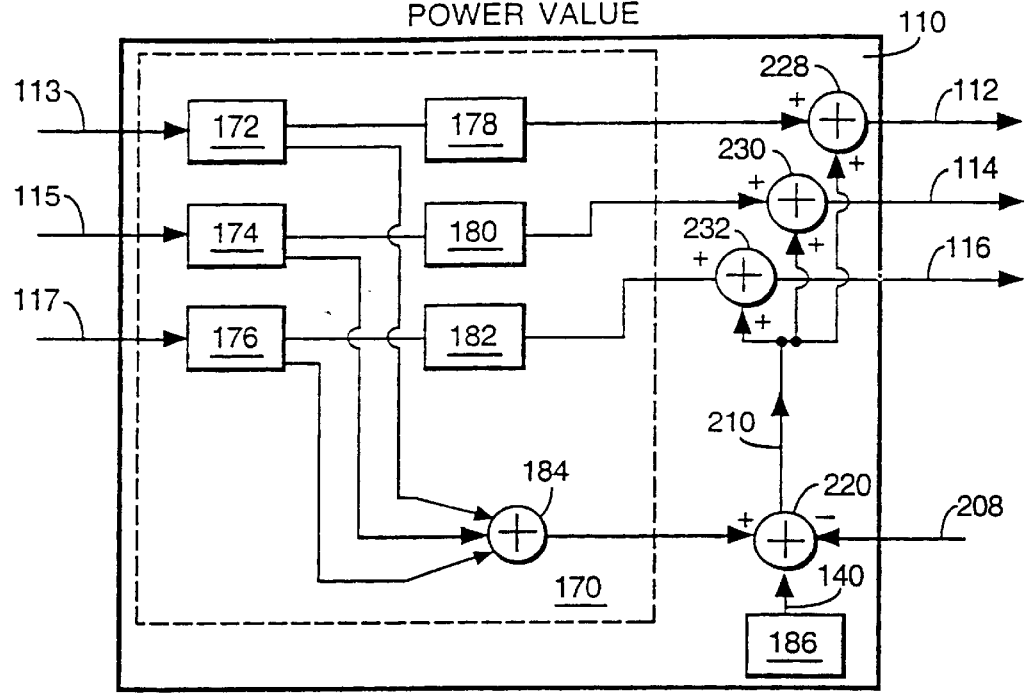

FIG. 4c schematically illustrates a microprocessor 110 suitable for use in the circuitry of FIG. 4a. The microprocessor 110 has circuitry 150 and subtracter 220 connected as previously described in relation to FIG. 3e. It additionally has first, second and third summers 228, 230 and 232 which combine the outputs of the first, second and third ramp controllers 178, 180 and 182 with the digital compensation signal 210 produced by the subtracter 220 to produce respectively the first, second and third power control signals 112, 114 and 116. The digital compensation signal 210 produced within this microprocessor 110 does not take into account the ramping up and ramping down of the carriers which combine to form the multi-carrier signal 24. The microprocessor does not effect power control during guard periods. The signal 140 from the timing controller 186 disables subtractor 220 during those periods.

The need for variable radio frequency or intermediate frequency attenuators or amplifiers is avoided.

The fifth embodiment is capable of having the four different implementations as described in relation to the earlier embodiments. Accordingly the adder 184 will operate in a similar manner as hereinbefore described in relation to the earlier embodiments.

Sixth Embodiment

Figure 5A:
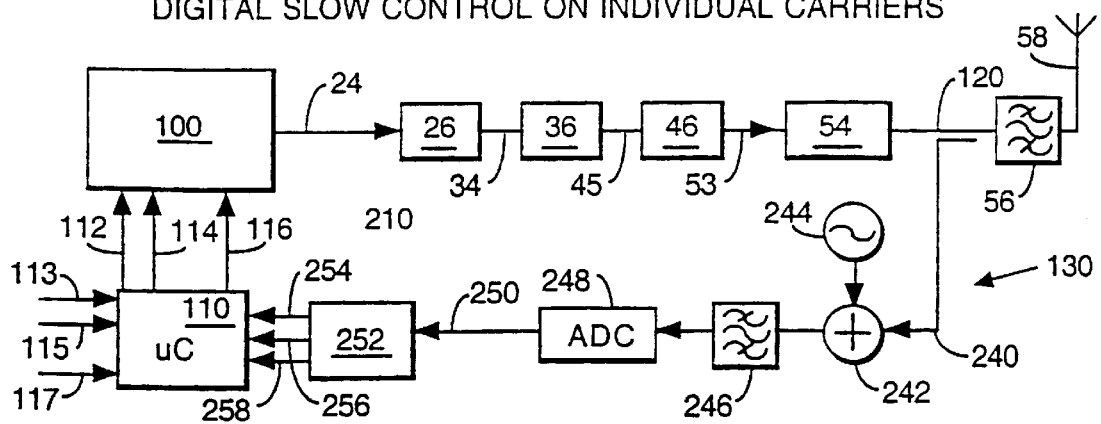
FIG. 5a illustrates a wide band multi-carrier transceiver in accordance with a sixth embodiment of the present invention.

FIG. 5a illustrates a sixth embodiment. Slow power control is achieved using the closed power control loop 130. A power coupler 120 samples a radio frequency multi-carrier signal 53 to produce a detected signal 240 which is input to a mixer 242 connected to a local oscillator 244. The output of the mixer 242 is passed through a band pass or low pass filter 246 and then converted by analogue to digital converter 248 into a digital detected signal 250. The digital detected signal 250 is input to a channeliser unit 252 which produces first, second and third output signals 254, 256 and 258 which are supplied to the microprocessor 110. The channeliser unit 252 determines the contributions to the digital detected signal 250 by the F1 carrier, F2 carrier and F3 carrier. The first, second and third output signals 254, 256 and 258 are respectively in proportion to the contributions made by the F1, F2 and F3 carriers. The channeliser unit which is supplied with the frequency values F1, F2 and F3, may produce the first, second and third output signals by performing fast fourier transforms (FFT) which is a well known procedure in the art or by some other method. The slow control loop is completed by the microprocessor 110 providing the first, second and third power control signals 112, 114 and 116 to the digital combiner 100.

Figure 5B:
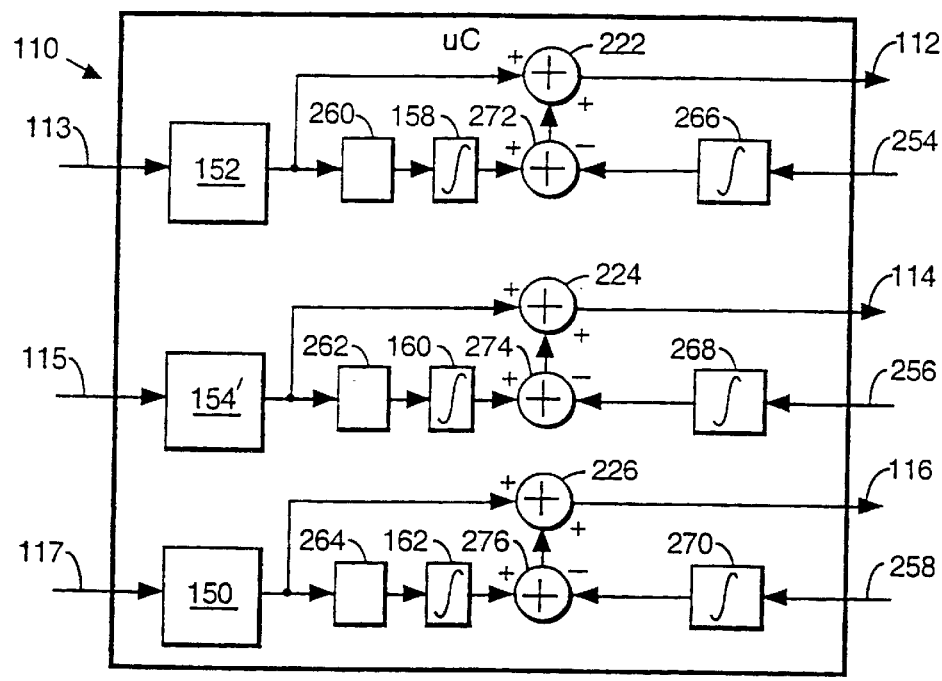

FIG. 5b schematically illustrates a microprocessor 110 suitable for use in the circuitry of FIG. 5a. The microprocessor 110 comprises first, second and third averagers 152, 154 and 156; first, second and third ramp generators 158, 160 and 162; and first, second and third adders 222, 224 and 226, which were previously described in relation to FIGS. 4b and 2b. The microprocessor 110 additionally comprises: first, second and third delays 260, 262 and 264; first, second and third subtracters 272, 274 and 276; and third, fourth and fifth averagers 266, 268 and 270.

The first ramp generator 152 provides its output to the first adder 222 and, via the first delay circuit 260, to the first averager 158. The first output signal 254 from the channeliser 252 is supplied to the fourth averager 266. The output of the first and fourth averagers are supplied to the first subtracter 272 which subtracts the output of the fourth averager 266 from the output of the first averager 158 and supplies its output to the first adder 222. The first adder 222 adds its two inputs to produce the first power control signal 112.

The second ramp generator 154, delay circuitry 262, averager 160, adder 224, subtracter 274 and fifth averager 268 cooperate in a similar manner to produce the second power control signal. Likewise, the third ramp generator 156, delay circuitry 264, averager 162, subtracter 276, adder 226 and the sixth averager 270 also combine in a similar fashion to produce the third power control signal 116. The first, second and third delay circuitries 260, 262 and 264 compensate for the delays introduced into the first, second and third output signals 254, 256 and 258 by the feed back path including the channeliser 252. In this microprocessor 110 the delay circuitries 260, 262 and 264 compensate for delays between the coupler 120 and inputs 254, 256 and 258. This includes the mixing (down-conversion), process, filtering, A/D conversion and channel separation. Depending upon the delays on the feedback path and transmission path delay circuitries 260, 262 and 264 may be optional, the averagers 158, 160, 162, 266, 268 and 270 average over a part or the whole of each time slot. The compensation effected by the slow control loop therefore takes into account the up and down ramping of the carriers. The averaging periods must be equal for both inputs into the adders 272, 274 and 276.

Figure 5C:
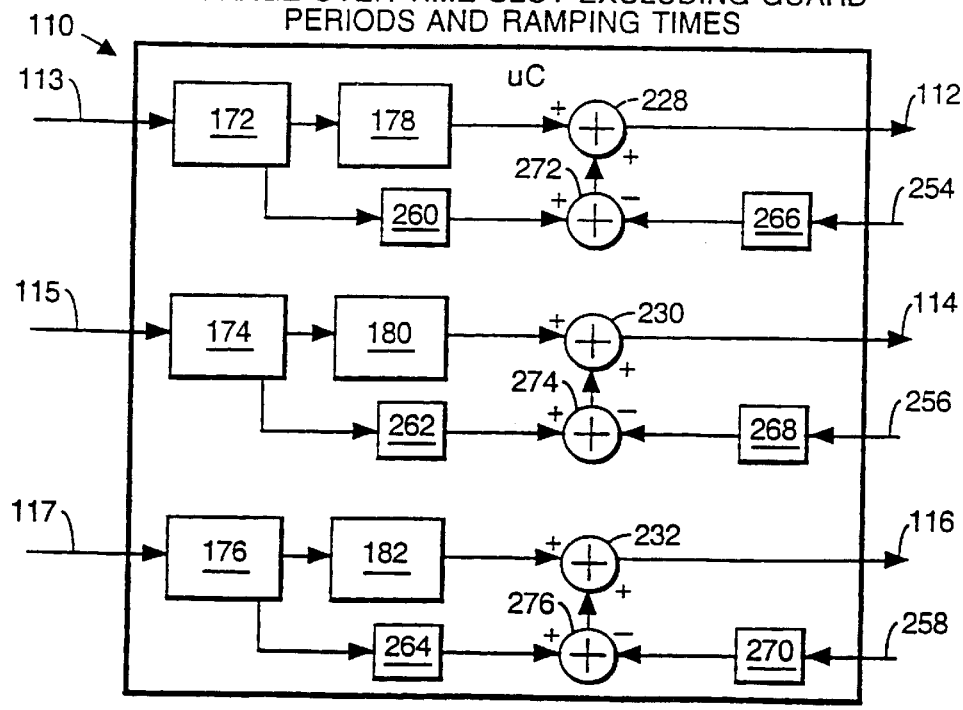

FIG. 5c schematically illustrates a microprocessor 110 which is preferably used in the circuitry of FIG. 5a. The microprocessor 110 comprises first, second and third registers 172, 174 and 176; first, second and third ramp generators 178, 180 and 182; first, second and third adders 228, 230 and 232 (previously described in relation to FIG. 4c), first, second and third delay circuitries 260, 262 and 264, first, second and third subtractors 272, 274 and 276 and fourth, fifth and sixth averagers 266, 268 and 270 (previously described in relation to FIG. 5b).

The outputs of the first, second and third ramp generators 178, 180 and 182 are input respectively to the first, second and third adders 228, 230 and 232. The outputs of the first, second and third registers 172, 174 and 176 are respectively supplied via the first, second and third delay circuitries 260, 262 and 264, to the first, second and third subtracters 272, 274 and 276 respectively. The first, second and third output signals from the channeliser 252 are respectively supplied as inputs to the first, second and third subtracters 272, 274 and 276 via the fourth, fifth and sixth averagers 266, 268 and 270, to be subtracted from the other input to their respective subtracters.

The outputs of the first, second and third subtracters 272, 274 and 276 are respectively supplied to the first, second and third adders 228, 230 and 232 which produce the first, second and third power control signals 112, 114 and 116 respectively. This microprocessor 110, does not take the ramping of the carriers into account in effecting its slow power control using the power control loop 130. The fourth, fifth and sixth averagers 266, 268 and 270 only average the first, second and third output signals for the channeliser for those periods during which each of the carriers which are combined to form the multi-carrier signal maintain their predetermined levels controlled by the first, second and third controllers 172, 174 and 176. Power detection using loop 130 is gated during the guard periods to prevent the ramping of the signals adversely affecting power control. A timing controller 186 (not shown) disables the adders 272, 274 and 276 during the guard periods.

In this embodiment the need for a variable radio frequency or an intermediate frequency attenuator or amplifier is avoided. In addition feed back control of each individual carrier can be used to automatically compensate for variations in the transmitter's frequency response.

Embodiments of the present invention can be incorporated in a base station or mobile terminal of a cellular network or in any other suitable transmitter.

What is claimed is:

1. A multi-carrier radio transmitter comprising:
   combination means for receiving and combining a plurality of carriers including a first modulated carrier for transmission in a first channel and a second modulated carrier for transmission in a second channel, to create a multi-carrier signal; and
   open loop power control means arranged to individually vary the power of each of the plurality of carriers before said combination and
   closed loop power control means arranged to vary the output power of the transmitter, the closed loop power control means being configured to operate on the multi-carrier signal after the combination means.

2. A multi-carrier radio transmitter of claim 1, wherein the opwn loop power control means is configured to effect relatively fast power variations and the closed loop control means is configured to effect relatively slow power variations.

3. A multi-carrier radio transmitter as claimed in claim 1, wherein said combination means is a digital combination means which receives and combines digital signals to create a digital multi-carrier signal.

4. A multi-carrier radio transmitter as claimed in claim 1, for receiving a plurality of input control signals wherein said power control means receives said plurality of input control signals and produces in response to each of said plurality of input control signals a power control signal for individually varying the power of each of the plurality of carriers before said combination to create said multi-carrier signal.

5. A multi-carrier radio transmitter as claimed in claim 4, having a plurality of modifying means, each being arranged to modify one of said modulated carriers by one of the power control signals.

6. A multi-carrier radio transmitter as claimed in claim 5, wherein each of said plurality of input control signals is associated with a channel and its variation is indicative of the variation of power attenuation in said channel.

7. A multi-carrier radio transmitter as claimed in claim 1, wherein said power control means comprises an open loop for effecting fast power variations and a closed loop for effecting slow power variations.

8. A multi-carrier radio transmitter as claimed in claim 7, wherein said power control means comprises means for providing a digital detected signal in respect of each channel to said controller, whereby the power control means is arranged to individually compensate the power control signals.

9. A multi-carrier radio transmitter as claimed in claim 1, wherein said power control means further comprises a closed power control loop having a detection means for detecting said multi-carrier signal to be transmitted and means responsive to the detecting means for altering the power of said multi-carrier signal responsive to said detected multi-carrier signal.

10. A multi-carrier radio transmitter as claimed in claim 9, wherein said detection means detects the average power, the amplitude or the peak power of the multi-carrier signal to be transmitted.

11. A multi-carrier radio transmitter as claimed in claim 9, wherein said closed power control loop effects power compensation of the multi-carrier signal responsive to the combined variations of all the carriers in said multi-carrier signal.

12. A multi-carrier radio transmitter as claimed in claim 9, wherein said power control means produces a reference signal and the detecting means in said closed power control loop couples to said multi-carrier signal to produce a detected signal, said power control means being responsive to variations in the detected signal with respect to the reference signal to alter the power of said multi-carrier signal.

13. A multi-carrier radio transmitter as claimed in claim 12, wherein said closed power control loop comprises a comparator connected to control a variable amplifier in the path of said multi-carrier signal, said comparator receiving said detected signal and said reference signal as inputs.

14. A multi-carrier radio transmitter as claimed in claim 9, wherein said closed power control loop further comprises a controller wherein said detection means couples to said multi-carrier signal to produce a detected signal which is provided to said controller which controls the altering of the power of said multi-carrier signal.

15. A multi-carrier radio transmitter as claimed in claim 14, wherein said closed power control loop further comprises scaling means in the path of said multi-carrier signal, wherein said controller provides a compensation signal to the scaling means to compensate said multi-carrier signal.

16. A multi-carrier radio transmitter as claimed in claim 15, wherein said scaling takes place separately for each of the carriers.

17. A multi-carrier radio transmitter as claimed in claim 15, wherein said scaling takes place on the combined multi-carrier signal.

18. A multi-carrier radio transmitter as claimed in claim 15, wherein said closed power control loop comprises amplification means for amplifying said analogue multi-carrier signal and a second digital to analogue conversion means, wherein the power control loop of said control means provides a compensation signal to said amplification means via said second digital to analogue conversion means to compensate said analogue multi-carrier signal.

19. A multi-carrier radio transmitter as claimed in claim 18, wherein said compensation signal is provided to control the digital to analogue conversion means arranged to produce said analogue multi-carrier signal.

20. A multi-carrier radio transmitter as claimed in claim 19, wherein said compensation signal is provided to control an amplifier in the path of said analogue multi-carrier signal.

21. A multi-carrier radio transmitter as claimed in claim 1, wherein each of said plurality of carriers has a different frequency, and, in successive predetermined periods of time, the carrier is transmitted to different receivers.

22. A multi-carrier radio transmitter as claimed in claim 21, wherein said control means varies the power of each of the plurality of carriers before combination by ramping each modulated carrier to an individually predetermined amplitude at the start of each successive predetermined period and ramps each modulated carrier downward at the end of each predetermined period.

23. A transceiver comprising a multi-carrier radio transmitter as claimed in claim 1 and a receiver, wherein said power control means is responsive to the signals received at said receiver.

24. A method of power compensation in a multi-carrier radio transmitter, wherein a plurality of carriers are combined to create a multi-carrier signal said plurality of carriers including a first modulated carrier for transmission in a first channel and a second modulated carrier for transmission in a second channel, comprising:
   a) determining the transmit power level required in each carrier;
   b) varying the power level of each carrier to the determined levels; and
   c) combining the carriers to form the multi-carrier signal; and
   d) compensating for changes in the power level of said multi-carrier signal using closed loop power control, by:
      detecting said multi-carrier signal; and
      adjusting the power of said multi-carrier signal in depence upon sais detection.

25. The method of claim 24, wherein open power control loop is configured to effect relatively fast power variations and the closed power control loop is configured to effect relatively slow power variations.

26. The method of claim 24, wherein in step d) the process of detecting the multi-carrier signal comprises detecting the combined power level of the carriers in said multi-carrier signal.

27. The method of claim 24, wherein in step d) the detection provides the average or peak power of the multi-carrier signal.

28. The method of claim 24, wherein in step d) the process of detecting the multi-carrier signal comprises separately detecting the power levels of each of the carriers in the multi-carrier signal.

29. The method of claim 24, wherein in step d) the process of adjusting the multi-carrier signal is effected after the combination of the plurality of carriers.

30. The method of claim 24, wherein in step d) the process of adjusting the multi-carrier signal is effected by individually varying the power level of each of said plurality of carriers before their combination.

31. The method of claim 24, wherein in step b) the varying of the power level of each carrier is dependent upon the frequency of the carrier.

32. The method of claim 24, wherein in step c) the combining of the carriers occurs when they are digital signals.

* * * * *